Jan. 8, 1924.  
E. N. GOODE ET AL  
FEEDING OF FUEL TO BLAST FURNACES  
Filed June 30, 1923

1,480,434

Inventors  
E. N. Goode  
M. J. Johns  
By Marks + Clerk Attys.

Patented Jan. 8, 1924.

1,480,434

UNITED STATES PATENT OFFICE.

EWART NOEL GOODE AND MORGAN JONES JOHNS, OF MOUNT MORGAN, QUEENSLAND, AUSTRALIA.

FEEDING OF FUEL TO BLAST FURNACES.

Application filed June 30, 1923. Serial No. 648,788.

*To all whom it may concern:*

Be it known that we, EWART NOEL GOODE and MORGAN JONES JOHNS, subjects of the King of Great Britain, residing at Mount Morgan, in the State of Queensland, Commonwealth of Australia, have invented certain new and useful Improvements in the Feeding of Fuel to Blast Furnaces, of which the following is a specification.

This invention relates to improvements in apparatus for feeding fuel to blast furnaces, and refers more especially to means for introducing solid or pulverized fuel into a furnace through the side thereof at a point above the tuyères and below the charge.

It has been proposed to introduce pulverized fuel into blast furnaces through tuyère openings along with air under pressure, but this method is fraught with danger from gas and coal dust explosion in the air mains or pipes leading to the tuyères.

The object of this invention is to provide means which shall be simple and economical in construction for mechanically feeding fuel, preferably granulated or pulverized, into blast furnaces at a point above the smelting zone and separate from the air blast.

We accomplish this object by arranging a series of rams horizontally on the outside of the furnace, below the level of the furnace charge, and above the smelting zone, and arranging gravity feed hoppers in communication with the rams whereby at the reciprocation of the latter a predetermined quantity of fuel will gravitate into the ram and be thrust into the furnace. The fuel is delivered to the hoppers through chutes depending from the bottom of a common conveyor, and means are provided enabling the rams to be conveniently removed when required, and for the introduction of poke bars into the furnace through the fuel passage.

Referring to the accompanying drawings—

The reference letter $a$ designates the furnace which is provided with the usual tuyères $b$ for introduction of the air blast below the charge therein.

The converging walls at the lower part of the furnace are water-jacketed as shown or are formed of refractory material.

The walls of the furnace, at a suitable height above the tuyères $b$ are formed with a series of feed openings $c$ through which granulated or pulverized fuel is fed into the furnace.

The feed openings $c$ are located to normally lie below the level of the charge, and above the smelting zone in the furnace, and fitted to the furnace walls in line therewith is a number of flanged coupling sleeves $d$.

The flanged coupling sleeves $d$ are adapted to support cylindrical casings $e$ in which plungers $f$ are reciprocated by means of eccentrics $g$ and connecting rods $h$.

The eccentrics $g$ are mounted on rotatable shafts $i$, which are adapted to receive motion by approved gearing from a suitable source of power (not shown).

The rams are formed by casings $e$ and reciprocating plungers $f$ preferably arranged at opposite sides of the furnace, and can be disposed as shown or in any other approved way.

The casings $e$ are detachably secured to and in line with the flanged coupling sleeves $d$ by approved devices, such as hooks $j$, which permit of said casings being easily and quickly removed when required.

The casings $e$ are formed with angularly disposed passages $k$ through which poke bars may be inserted to clear fuel passages or stir up the lower part of the charge in the furnace. The passages $k$ are preferably disposed on the under sides of the casings $e$, and have their outer ends closed by removable plugs $l$.

The top of each casing $e$ is formed with a throat $m$ preferably of funnel shape, upon which is mounted a hopper $n$ for the fuel to be delivered into the furnace by the reciprocating plunger.

The throat $m$ is disposed above that part of the casing in which the plunger reciprocates and the fuel passes therethrough and into the casing when the plunger is in its outermost position. The inward movement of the plunger causes the fuel to be delivered to the casing to be thrust into the furnace.

Figures 1, 2:
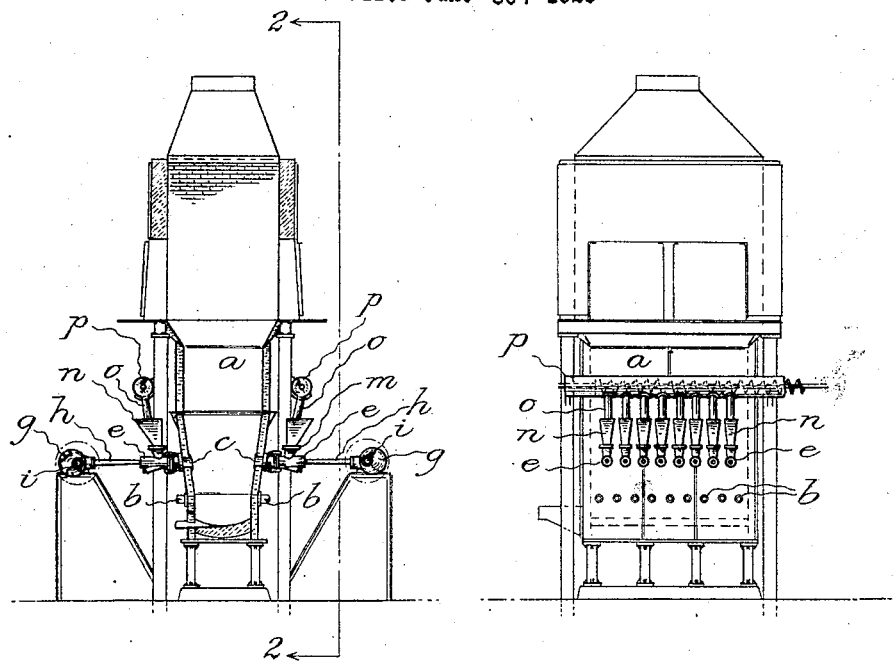
Figure 1 is a sectional front elevation of a blast furnace provided with fuel feeding apparatus made in accordance with the invention.
Figure 2 is a side elevation of Figure 1, partly in section, along the dotted line 2—2.
Figure 3:
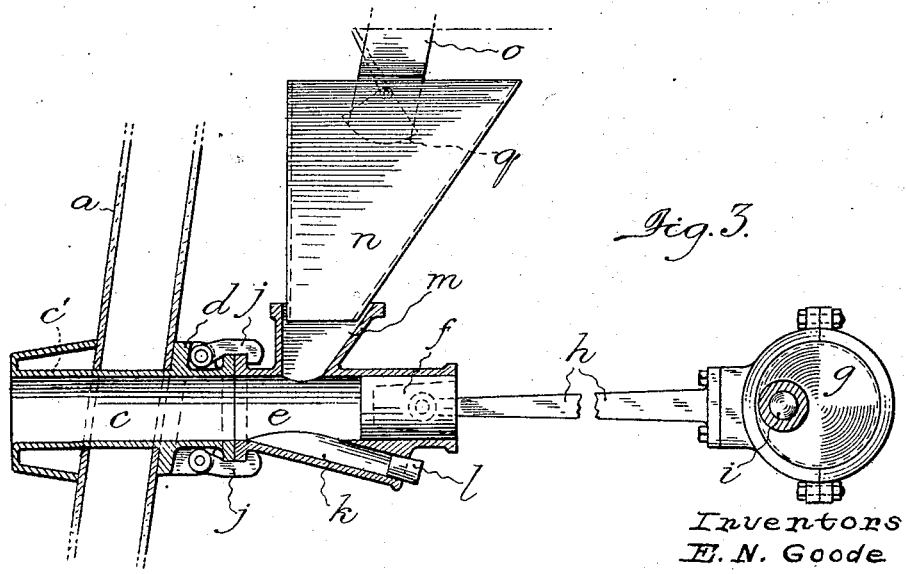
Figure 3 is a sectional elevation of the fuel feeding apparatus drawn to a larger scale than in the other views.

As it is desirable to discharge the fuel from the sleeve c beyond the inner surface of the wall a of the furnace, we prefer to extend the sleeve inwardly beyond the inner surface of the wall a, so as to form a water-cooled nozzle c', as best shown in Fig. 3.

The hoppers receive the supply fuel from the chutes o depending from the bottom of the casing of the screw conveyor p and the lower ends of the said chutes o are provided with shutters q (shown by dotted lines Figure 3) for regulating the rate at which the fuel is to be delivered to the hoppers. The shutters q are preferably pivotally mounted.

The eccentrics g can be arranged to operate the plungers in unison, or can be so disposed as to cause some plungers to move on the forward stroke when others are moving on the return stroke.

The hopper n may be made sufficiently large to enable the supply of fuel to be maintained therein of a sufficient weight to overcome the normal pressure within the furnace, but not to resist abnormal plus pressure set up therein. This feature provides for the escape of gases through the fuel in the hopper should an excessive pressure be produced within the furnace or the plunger casing, thereby obviating damage to the furnace or fuel feeding apparatus.

We claim:—

1. The combination with a blast furnace having a wall provided with tuyère openings near its lower end and fuel feeding openings arranged below the level of the charge and above the tuyère openings, of a series of tubular casings arranged to feed fuel through the fuel openings, a plunger reciprocatingly mounted in each casing, a fuel throat supported above said casing and adapted to deliver fuel into the casing when the plunger is at the outermost end of its stroke, and fuel sealed means for preventing the admission of air or gas into the furnace through said casings and fuel feeding openings.

2. The combination with a blast furnace having a wall provided with tuyère openings near its lower end and fuel feeding openings arranged below the level of the charge and above the tuyère openings, of a series of sleeves snugly fitting in said fuel openings, tubular casings arranged exteriorly of the furnace, quick-detachable means connecting one end of each casing to the outer end of one of the sleeves, plungers reciprocatingly mounted in said casings, hoppers supported above and adapted to deliver fuel into the casings in advance of the plungers, and conveyors for delivering fuel to the said hoppers.

3. The combination with a blast furnace having an annular wall provided with tuyère openings near its lower end and a horizontally arranged series of fuel feeding openings below the level of the charge and above the tuyère openings, a sleeve extending through each of said openings, a tubular casing connected to the outer end of each sleeve and having an intake throat, means for feeding fuel into each of said throats, a plunger reciprocatingly mounted in each casing, a power shaft, and means connecting all of said plungers to said shaft.

4. The combination with a blast furnace having a wall provided with tuyère openings near its lower end and fuel feeding openings above the tuyère openings, of a sleeve extending through each of said fuel openings and having a water-cooled nozzle at its inner end projecting into the furnace beyond the inner surface of said wall, a tubular casing connected to the outer end of said sleeve and means for feeding fuel through the tubular casing and sleeve, into said furnace.

In testimony whereof we have affixed our signatures in presence of two witnesses.

EWART NOEL GOODE.
MORGAN JONES JOHNS.

Witnesses:
GEORGE R. CULLEN,
JOHN H. LINQUIST.